Figure 3:
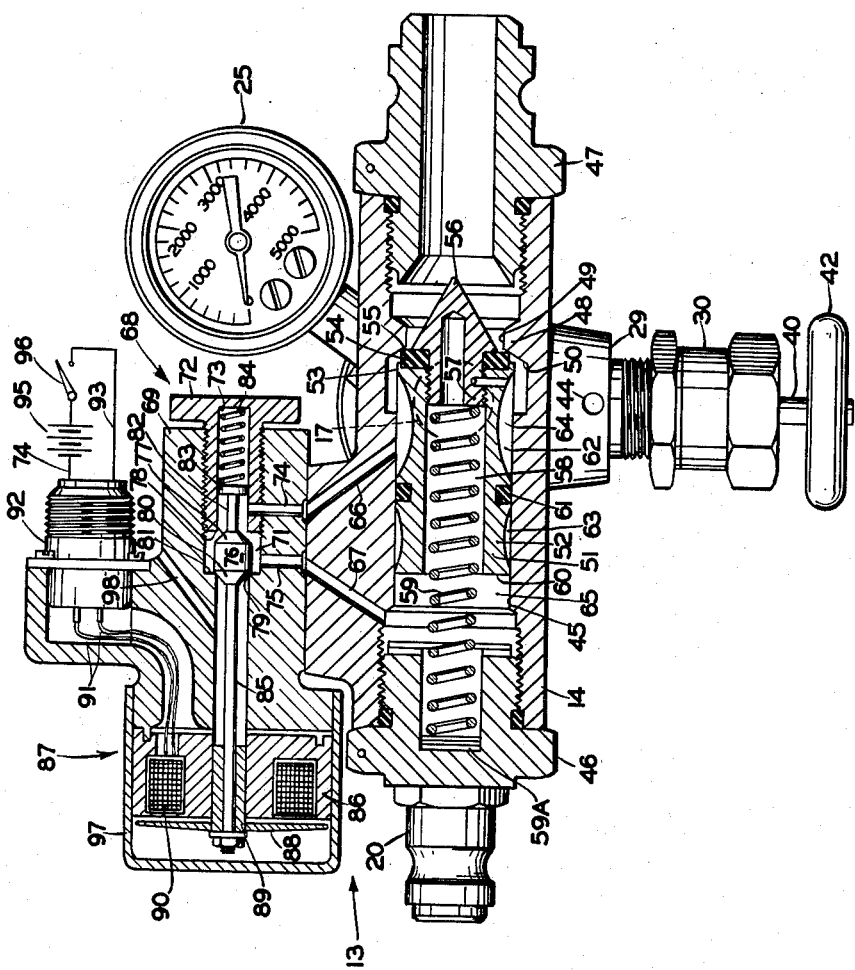

Aug. 26, 1958  J. J. KELLY ET AL  2,849,023
COMBINATION VALVE MEANS
Filed May 28, 1953  2 Sheets-Sheet 1
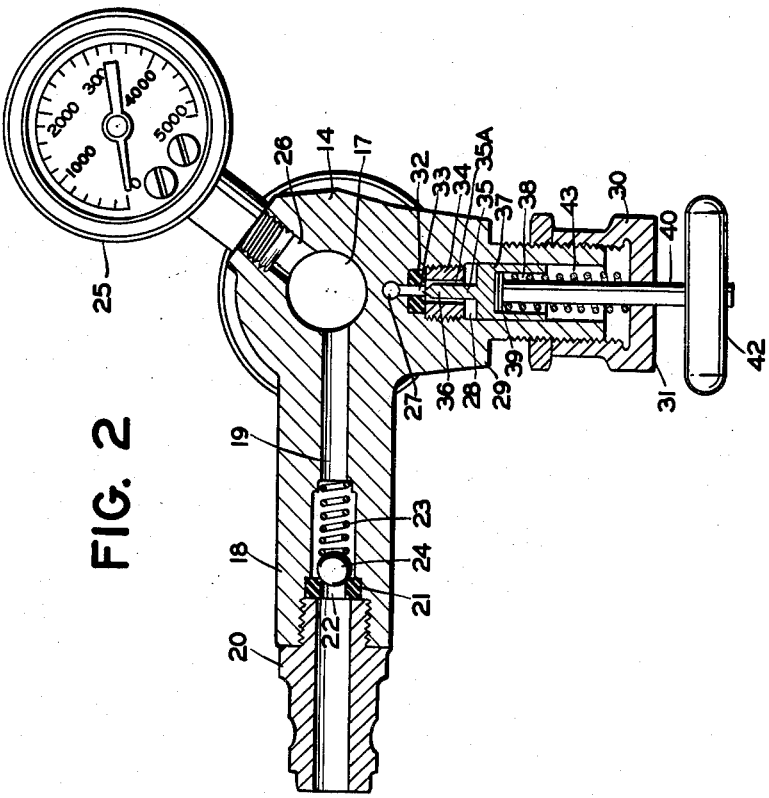
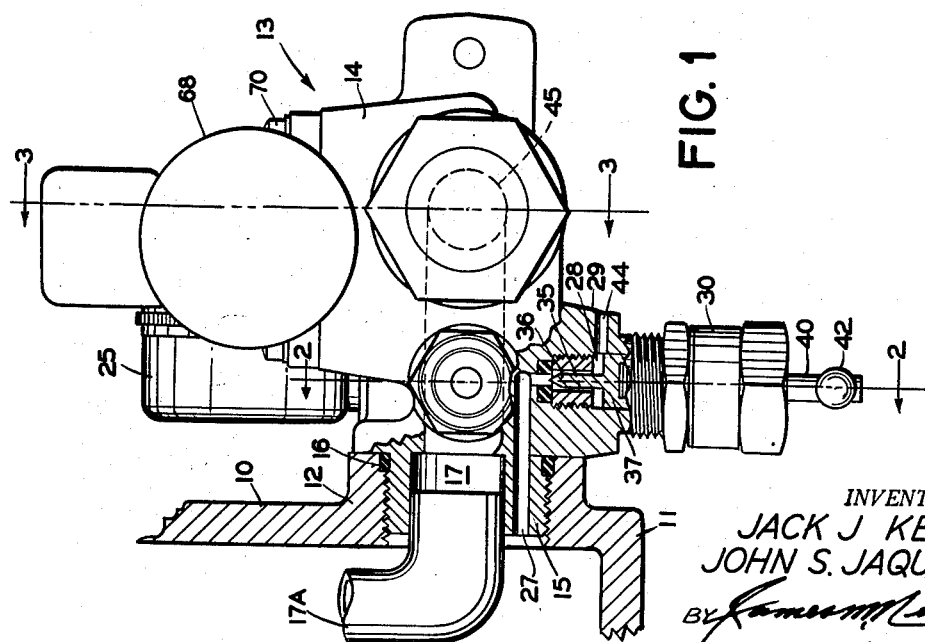
INVENTORS
JACK J. KELLY
JOHN S. JAQUITH
BY *James M. Nickels*
ATTORNEY Aug. 26, 1958

J. J. KELLY ET AL 2,849,023

COMBINATION VALVE MEANS

Filed May 28, 1953

2 Sheets-Sheet 2

INVENTORS
JACK J. KELLY
JOHN S. JAQUITH

BY James M. Mickels

ATTORNEY

United States Patent Office 2,849,023
Patented Aug. 26, 1958

2,849,023

COMBINATION VALVE MEANS

Jack J. Kelly, Waldwick, and John S. Jaquith, Cedar Grove, N. J., assignors to Bendix Aviation Corporation, Teterboro, N. J., a corporation of Delaware Application May 28, 1953, Serial No. 358,066

4 Claims. (Cl. 137—546)

This invention relates in general to valves and more particularly has to do with a novel combination valve for use with tanks or containers for pressurized fluids.

Tanks containing a pressurized fluid have come into wide use in many fields. For example, the pressurized or compressed air used in the operation of air-combustion starters for aircraft engines is usually stored in a tank carried by the aircraft. Tanks of this type require various valves such as a filler valve, a pressure relief valve, a drain valve and a valve for controlling the delivery of the fluid from the tank to the point of its use. One of the problems posed in the use of tanks of this type is to prevent leakage of the pressurized fluid from the tank and it has been found that leakage frequently occurs at the joints where the various valves are connected to the tank.

The present invention contemplates and has for one of its objects the provision of a novel combination valve for use with a tank of the above type, which valve includes means for filling the tank, means for relieving excessive pressure and draining undesired accumulations from the tank, means for controlling the delivery of fluid from the tank and which is adapted to be associated with the tank through a single connection or joint to thereby reduce to a minimum the possibility of leakage from the tank.

Among other objects the present invention contemplates the provision within a valve of the above type of a novel combination pressure relief and drain valve means that is operable either automatically by the pressurized fluid in the tank or manually to relieve excessive pressure or drain undesired accumulations from the tank.

Another object of the present invention is the provision within a valve of the above type of a novel delivery valve means adapted for operation by the pressure of the fluid stored in the tank.

A further object of the instant invention is to provide a novel pressure operated valve including means for regulating the rate of opening or closing of the valve.

Other objects and advantages of the present invention will appear more fully hereinafter from a consideration of the detailed description which follows taken together with the accompanying drawings wherein one embodiment of the present invention is illustrated by way of example. It is to be expressly understood, however, that the drawings are for the purpose of illustration only and are not to be construed as defining the limits of the invention.

In the drawings wherein like reference character-designated like parts throughout the several views, Figure 1 is an elevational view, partly in section, of the novel valve contemplated herein and showing the same mounted to the bottom of a tank for storing a fluid under pressure, Figure 2 is a section taken along line 2—2 of Figure 1, and Figure 3 is a section taken along line 3—3 of Figure 1.

Referring now to the drawings, particularly Figures 1 and 2, reference character 10 designates a conventional tank or container for holding a pressurized fluid. Adjacent its base on bottom wall 11, tank 10 is provided with an internally threaded outlet 12.

The novel combination valve contemplated herein, designated generally by reference character 13, comprises a body or casing 14 having an externally threaded extension 15 adapted to be received in outlet 12 to mount valve 13 to tank 10. Suitable gasket means 16 interposed between the outer end of outlet 12 and casing 14 prevents leakage between the coacting threads of outlet 12 and extension 15. Extension 15 is provided with a bore 17 that extends into casing 14 and which serves as an inlet for tank 10 during the filling thereof and as an inlet for valve 13 during the time fluid from tank 10 is being delivered therefrom. A standpipe 17a extends from bore 17 into tank 10 to prevent undesired accumulations from entering valve 13 through bore 17.

To provide means for filling tank 10 with a pressurized fluid, an extension 18 of casing 14 has a bore 19 formed therein that is internally threaded at its outer end to receive an externally threaded inlet fitting 20 and which communicates at its inner end with inlet bore 17. A valve seat 21, fabricated from a suitable material such as synthetic polymeric amide, is held in position against a shoulder in bore 19 by the inner end of inlet fitting 20 so as to have a centrally disposed orifice 22 formed therein positioned in axial alignment with bore 19. A spring 23 operative between a second shoulder formed in bore 19 and a spherical valve member 24, urges the latter into sealing contact with valve seat 21 to close orifice 22.

When a source of fluid under pressure is connected to inlet fitting 20, the pressure of the fluid moves spherical member 24 off its coacting seat 21 against the bias of spring 23 to open orifice 22. The pressurized fluid then passes through bores 19 and 17 into tank 10. Upon disconnection of the source from fitting 20, the pressure of the fluid in bore 19 and the biasing force of spring 23 reseats spherical member 24 to close orifice 22. From the foregoing description, it is manifest that seat 21, orifice 22, spherical member 24 and spring 23 serve as a oneway check valve controlling flow through bore 19.

A conventional pressure gage 25 mounted to casing 14 communicates with bore 17 through a passageway 26 and serves to indicate the pressure of the fluid in tank 10.

Valve 13 also includes means for venting excessive pressure from tank 10 which also serves as means for draining undesired accumulations from within the tank.

To the above end, a relatively small bore 27 extends through extension 15 and communicates at its inner end with a bore 28 formed in an extension 29 of casing 14. Extension 29 is threaded at its outer end to receive a cap 30 having an end wall 31 that serves to close the outer end of bore 28. At its inner end, bore 28 is provided with a valve seat 32 fabricated from a suitable material such as synthetic polymeric amide and which has a central orific 33 in axial alignment with the inner end of bore 27 and bore 28. Seat 32 is held in position against the inner end of bore 28 by a collar 34 that is threaded into the inner end of bore 28 and which has a central opening in axial alignment with orifice 33 in which is mounted a valve stem 35. A clearance 35a between stem 35 and the opening in collar 34 permits fluid to pass therebetween when orifice 33 is opened. The inner end of stem 35 has a tapered or conical tip 36 adapted to sealingly engage valve seat 32 to close orifice 33. The opposite end of stem 35 is provided with a piston 37 that is slidably received in bore 28 and which has a recess 38 formed in the outer end thereof to receive a flanged end 39 of an actuating rod 40. Rod 40 is slidably mounted through end wall 31 of cap 30 and the outer end thereof is provided with cross-bar or handle 42. A spring 43 operative between the inner surface of end wall 31 and flanged end 39 of rod 40 urges the latter into contact with piston 37 and imposes a biasing force on stem 35 that moves it in collar 34 to sealingly engage tip 36 with its coacting seat 32. Stem 35 is dimensioned to the end that when the tip 36 thereof is engaged with seat 32, piston 37 is spaced from the outer end of collar 34. A port 44 extending through the side wall of extension 29 opens at one end into the space between piston 37 and collar 34 while the opposite end thereof opens to the exterior of extension 29.

Due to the foregoing construction and arrangement, the pressurized fluid in tank 10 passes through bore 27 to orifice 33 where it is effective on the area of tip 36 disposed therein to produce a force tending to move stem 35 against the bias of spring 43. By rotating cap 30 on extension 29, the biasing force of spring 43 may be adjusted to the end that valve stem 35 is moved only in response to pressures above a predetermined value. Therefore, when the pressure in tank 10 rises to a value where the force produced thereby on tip 36 is greater than the biasing force of spring 43, stem 35 is moved away from orifice 33 to the end that communication is established from tank 10 through bores 27, clearance 35a and bore 28 to vent port 44 and the excessive tank pressure is vented or relieved. Moreover, since bore 27 opens into the bottom of tank 10 any undesired accumulations in the bottom of tank 10 will be drained therefrom during the venting operation.

In the event the pressure in tank 10 is to be vented or drained during a time when the pressure of the fluid therein is below the predetermined value at which stem 35 is automatically moved to open position as hereinbefore set forth, handle 42 is pulled to compress spring 43 between flanged end 39 of rod 40 and wall 31 of cap 30. The biasing force of spring 43 is thereby removed from stem 35 to the end that a relatively low pressure in tank 10 will move stem 35 to its open position.

Valve 13 also includes means for controlling the delivery of the pressurized fluid in tank 10. As shown in Figures 1 and 3, casing 14 is also provided with a bore 45 having an internally threaded section at one end thereof adapted to receive an externally threaded plug 46 that serves as an end wall for the bore. The opposite end of bore 45 is provided with a similarly threaded section in which is mounted an outlet fitting 47. Inlet bore 17 opens into bore 45 medially of its length to communicate the latter with the interior of tank 10. Between the junction of bores 17 and 45 and outlet fitting 47, an annular shoulder 48 extends inwardly into bore 45 to define an orifice 49 of lesser cross-sectional area than bore 45. The upstream side of shoulder 48 is provided with a sloping surface which serves as a valve seat 50. A valve element 51 comprising a substantially cylindrical body 52 dimensioned to be slidably received in bore 45, is recessed at one end 53 to partially receive a valve disc 54 fabricated from a suitable material such as synthetic polymeric amide having an edge 55 adapted to sealingly engage valve seat 50 to thereby close communication through orifice 49. Disc 54 is maintained in position by a tapered member 56 having a threaded stem 57 extending normally from the base thereof and which passes through a central aperture in disc 54 to engage the threaded end of a longitudinal throughbore 58 centrally formed in valve body 52. Disc 54 is thus clamped between the base of tapered member 56 and the inner wall of the recess formed in the end 53 of valve body 52 and tapered member 56 is positioned to extend into and through orifice 49 when disc 54 is engaged with its coacting seat 50. A spring 59 having one end disposed in bore 58 and its opposite end disposed in a recess formed in plug 46 imposes a force on valve element 51 tending to move it to engage its disc 54 with seat 50. Moreover, by inserting shims 59a between the inner end wall of plug 46 and the adjacent end of spring 59, the biasing force of spring 59 may be adjusted to a desired value.

Intermediate its opposite ends 53 and 60, valve body 52 is provided with a peripheral groove in which is operatively positioned an annular sealing member or O ring 61 adapted to slidably and sealingly engage bore 45. Valve body 52 is also provided between its end 53 and seal 61 with a plurality of axial channels 62 and between seal 61 and end 60 with a plurality of axial channels 63. Due to this construction, bore 45 is divided into a first pressure chamber 64 defined between seal 61 and valve seat 50, and into which bore 17 opens, and a second pressure chamber 65 defined between seal 61 and the inner end of plug 46.

To provide means for intercommunicating chambers 64 and 65 to thereby balance the pressures therein, or in the alternative to prevent such intercommunication and vent chamber 65 to the exterior of valve 13 to thereby unbalance the pressures between chambers 64 and 65, casing 14 is provided with passageways 66 and 67 which serve to connect chambers 64 and 65, respectively, with a solenoid actuated transfer valve 68.

More particularly, transfer valve 68 comprises a housing 69 secured to casing 14 by suitable means such as bolts 70 (Figure 1). Housing 69 has formed therein a longitudinal bore 71 having a threaded end section at one end to receive a plug 72 that serves to close the end of the bore and which is provided with a recess 73 opening into bore 71. A first passage 74 passing through the side wall of plug 72 and housing 69 connects with passageway 66 to communicate chamber 64 with bore 71, while a second passage 75 through housing 69 connects with passageway 67 to communicate chamber 65 with bore 71. A valve spool 76 slidably mounted on bore 71 is provided with a first sloping surface 77 adapted to sealingly engage a valve seat 78 formed on the inner end of plug 72 and with a second sloping surface 79 adapted to sealingly engage a valve seat 80 formed on a shoulder 81 in bore 71 when surface 77 is disengaged from its coacting seat 78. A stem 82 extending from surface 77 is provided at its end with a piston 83 that is slidably received in recess 73 of plug 72. A spring 84 operatively positioned between piston 83 and the inner end wall of recess 73 imposes a biasing force in spool 76 tending to move the same to engage surface 79 with its coacting seat 80 to close communication through the latter. When spool 76 is thus positioned, surface 77 is disengaged from seat 76 to open communication therethrough and thereby communicate chambers 64 and 65 through passageway 66, passage 74, bore 71, passage 75 and passageway 67 to the end that the pressure in these are brought into balance. The biasing force of spring 84 may be adjusted to a desired value by rotating plug 72.

Valve spool 76 is also provided with a second stem 85 that extends from surface 79 through bore 71 and the core 86 of a solenoid 87. The outer end of stem 85 is secured to an armature 88 of solenoid 87 and is provided with an insulating sleeve 89 slidably received in core 86. Coil 90 of solenoid 87 is connected through suitable electrical leads 91 with an electrical plug 92 suitably mounted in housing 69 and which is connected to an electrical circuit shown schematically in Figure 3, as comprising electrical leads 93 and 94, battery 95 and switch 96. Solenoid 87 is secured to housing 69 by suitable means, not shown, and is provided with a cover 97. When switch 96 is closed, coil 90 is energized and armature 88 is moved toward core 86 against the bias of spring 84 with the result that stem 85 moves valve spool 76 to disengage surface 79 from its seat 80 to open the same and to engage surface 77 with its seat 78 to close the latter. When the valve spool 76 is thus positioned, chamber 65 is connected through passageway 67, passage 75 and bore 71 with a vent port 98 formed in housing 69 between shoulder 81 and solenoid 87. Thus, in the second position of valve spool 76, the pressure of the fluid in chamber 64 is balanced with the pressure of the fluid in tank 10, while chamber 65 is exposed to ambient pressure.

As shown in Figure 3, when valve disc 54 is engaged with its seat 50, the portion of valve element 51 within chamber 64 has equal and oppositely disposed surfaces exposed to the pressure of the fluid in the chamber except for a surface or area equal to the solid cross-sectional area of valve body 52 which is equal to the cross-sectional area of bore 45 less the cross-sectional area of valve disc 54 at its edge 55. Moreover, the area thus defined is so disposed that the pressure in chamber 64 acting thereon is effective to produce a force tending to move valve element 51 against the bias of spring 59 to open orifice 49. On the other hand, the portion of valve element 51 disposed in chamber 65 has a surface equal to the solid cross-sectional area of valve body 52 and this effective area is so disposed that the pressure in chamber 65 acting thereon is effective to produce a force tending to move valve element 51 to close orifice 49 thus augmenting the biasing force of spring 59. Thus, due to the foregoing construction the effective area of valve element 51 exposed to the pressure in chamber 64 is substantially less than the effective area of valve element 51 exposed to the pressure in chamber 65 when valve disc 54 is engaged with its coacting seat 50. Therefore, when transfer valve 68 is in its first position, the pressures in chambers 64 and 65 are balanced with the pressure of the fluid in tank 10. The net force produced by these balanced pressures acting on the relative effective areas of valve element 51 disposed chambers 64 and 65 act to move valve element 51 to closed position thereby augmenting the biasing force of spring 59. Thus, when tank 10 is filled with a pressurized fluid, valve element 51 is maintained in a position closing orifice 49 by the force exerted by spring 59 and a force produced by the pressure of the fluid on tank 10 acting on the relative effective areas of valve element 51 disposed in chambers 64 and 65. Moreover, the greater the pressure of the fluid in tank 10, the greater will be the net force produced thereby augmenting the force of spring 59 to the end that sealing contact between valve disc 54 and its coacting seat 50 increases with increased tank pressure.

To move valve element 51 to its open position and thereby connect tank 10 through bore 17, chamber 64 and orifice 49 with outlet 47, transfer valve 68 is moved to its second position. The tank pressure in chamber 65 is thereby vented to the exterior of valve 13 to balance the pressure therein with a base or ambient pressure while the pressure in chamber 64 remains at tank pressure. This unbalancing of the pressures in chambers 64 and 65 produces a differential between the pressures in the chambers. The net force produced by this pressure differential acting on relative effective areas of valve element 51 disposed in chambers 64 and 65 moves valve element 51 to open position against the bias of spring 59.

As valve element 51 moves in the opening direction in response to the pressure differential occasioned by the unbalancing of the pressures in chambers 64 and 65, tapered member 56 moves out of orifice 49 thereby exposing a progressively increasing effective area of valve element 51 to the pressure in chamber 64 and thereby progressively increasing the net force moving valve element 51 to its open position with the result that the rate of movement of valve element progressively increases. Thus, valve element 51 is moved to its open position smoothly and quickly to communicate tank 10 with outlet 47.

To close orifice 49 and thereby discontinue the delivery of pressurized fluid from tank 10, transfer valve 68 is returned to its first position thereby reestablishing communication between chambers 64 and 65 and balancing the pressures therein with the pressure of the fluid in tank 10. Since valve element 51 is in its fully open position with its tapered member 56 out of orifice 49, the relative effective areas of valve element 51 exposed to the pressures in chambers 64 and 65 are substantially equal with the result that the forces produced by the pressures in these chambers acting on the relative effective areas disposed therein are balanced or cancelled out. The force imposed by spring 59 on valve element 51, however, initiates movement of the valve element toward its closed position. As valve element 51 is moved toward closed position by spring 59, tapered member 56 enters orifice 49 thereby progressively decreasing the effective area of valve element 51 exposed to the pressure in chamber 64. Therefore, the net force produced by the balanced pressures in chambers 64 and 65 acting on the relative effective areas of valve element 51 disposed therein progressively increases as tapered member 56 moves into orifice 49 with the result that the rate of movement of valve element 51 toward its closed position also progressively increases. Moreover, the increased velocity of the fluid passing through orifice 49 between tapered member 56 and the orifice produces an additional force tending to move valve element 51 toward orifice 49. This latter force being known by those having ordinary skill in the art as "Bernoulli effect." Thus, tapered member 56 serves as a means for regulating the rate of closing orifice 49, as well as the rate of opening thereof as hereinbefore set forth.

From the foregoing description it will be apparent to one having ordinary skill in the art that to fill tank 10 with a pressurized fluid, switch 96 is moved to its open position thereby permitting spring 84 of transfer valve 68 to move valve spool 76 to its first position to the end that chambers 64 and 65 in bore 45 are intercommunicated and the pressures therein are brought into balance. Valve element 51 is then moved to a position engaging its disc 54 with seat 50 by the force of spring 59 plus any force that may be produced by the balanced pressures in chambers 64 and 65 acting on the relative areas of valve element 51 disposed therein.

A source of pressurized fluid is then connected to inlet fitting 20 of bore 19 and the pressurized fluid displaces spherical member 24 from its seat 22 against the bias of spring 23 to open orifice 22 and permit the pressurized fluid to flow through bore 19 and bore 17 into tank 10. The pressurized fluid also passes from bore 17 into chamber 64 and through passageways 66 and 74, bore 71, and passageways 75 and 67 into chamber 65. The pressures in chamber 64 and 65 are therefore in balance with the result that valve disc 54 of valve element 51 is held in engagement with its coacting seat 50 to close orifice 49 by the forces imposed thereon by spring 59 and by the net force developed by the balanced pressures in chambers 64 and 65 acting on the relative effective areas of valve element 51 disposed therein. As the pressure of the fluid increases in tank 10, the net force produced thereby acting to engage valve element 51 with its seat 50 increases to the end that disc 54 is firmly engaged with its seat 50.

When tank 10 is filled to a desired capacity, as indicated by gage 25, the source of pressurized fluid is disconnected and spherical member 24 is reseated by spring 23 and the pressure of the fluid in bore 19 to close orifice 22.

To deliver the pressurized fluid from tank 10, switch 96 is closed thereby energizing coil 90 and armature 88 is moved toward core 86. Stem 85 moves valve spool 76 to its second position closing communication through passageways 66 and 74 and venting chamber 65 through passageways 67 and 75, bore 71 and vent port 98. The pressures in chambers 64 and 65 are now unbalanced with tank pressure in the former and an ambient or base pressure in the latter.

In response to this pressure differential, valve element 51 is moved against the biasing force of spring 59 to disengage disc 54 from its coacting seat 50 to open orifice 49 and to connect the interior tank 10 to outlet 47. During the opening movement of valve element 51, tapered member 56 operates in the manner hereinbefore set forth to regulate the rate of opening of orifice 49.

To stop the delivery of pressurized fluid from tank 10, switch 96 is opened thus deenergizing coil 90 and permitting spring 84 to return valve spool 76 to its first position. As a result valve seat 80 is closed and valve seat 78 is opened to the end that pressurized fluid is admitted from chamber 64 to chamber 65 and the pressures in these chambers are balanced with each other and with the pressure of the fluid in tank 10. Spring 59 initiates movement of valve element 51 toward its closed position and as tapered section 56 moves into orifice 49 the net forces produced by the balanced pressures in chambers 64 and 65 augments the force of spring 59 to move valve element 51 and engage disc 54 thereof with seat 50 to close orifice 49. During the closing of movement of valve element 51, tapered member 56 cooperates with orifice 49 to regulate the rate of closing as above set forth.

During the filling operation of tank 10 or at any time thereafter, any accumulation within tank 10 may be drained therefrom by pulling a handle 42 and compressing spring 43 thereby permitting the pressurized fluid to move stem 35 to open position. Tank 10 is then connected to the exterior of valve 13 through bores 27 and 28 and vent port 44.

In the event the pressure in tank 10 increases above a predetermined value determined by the setting of spring 43, the pressure in tank 10 will move stem 35 to its open position and the excessive pressure vents through bores 27 and 28 and vent port 44.

Having thus described the details of construction, arrangement and operation of the novel combination valve contemplated herein it will be apparent to one having ordinary skill in the art to which the subject matter of the present invention pertains that the various objects of the instant invention hereinbefore set forth have been achieved.

Although only one embodiment of the instant invention has been illustrated and described, it is understood that various changes may be made in the form or arrangement of the parts of the novel combination valve contemplated herein without departing from the scope of the invention. For example by varying the relative effective areas of the valve element 51 disposed in chambers 64 and 65, and the rate of spring 59 the response of valve element 51 to the net forces produced thereby may be adjusted. Further, although metering element 56 is shown as being substantially conical in form, it is understood that other forms may be used to provide for the increase or decrease of the effective area of valve element 51 as metering member 56 moves relative to orifice 49.

We claim:

1. A fluid control unit for filling a tank with a pressurized fluid, for delivering the fluid from the tank and for relieving the tank of excessive pressure comprised of a casing, a first bore for communicating with the interior of the tank, a second bore in said casing adapted to receive a pressurized fluid and communicating with said first bore, valve means in said second bore controlling the flow of pressurized fluid therethrough, a third bore in said casing communicating with said first bore and having an outlet, an orifice in said third bore between the junction of said first and third bores and said outlet and having a valve seat facing into said third bore, a valve element slidable on said third bore and having a valve disc for engagement with said valve seat to close said orifice, means carried by said valve element dividing said third bore into first and second chambers, said first bore communicating with said first chamber, resilient means in said second chamber engaged with said valve element and imposing a force thereon tending to move said valve element to closed position, said valve element having effective areas disposed in said first and second chambers, the effective area of said valve element in said first chamber being relative less than the effective area thereof in said second chamber when said valve element is in closed position, and electric solenoid controlled valve means effective in one position to intercommunicate said first and second chambers whereby the pressures therein are balanced and the net force produced thereby on the effective areas of said valve element when it is in its closed position augments the force of said resilient means to maintain said valve element in closed position, and in a second position to vent said second chamber whereby the pressures in said first and second chambers are unbalanced and the net force produced thereby on the effective areas of said valve element moves said valve element to open position against the biasing force of said resilient means to thereby open said orifice and permit flow from the tank through said valve.

2. A fluid control unit for filling a tank with a pressurized fluid, for delivering the fluid from the tank and for relieving the tank of excessive pressure comprised of a casing, a first bore on said tank communicating with the interior of the tank, a second bore in said casing adapted to receive a pressurized fluid and communicating with said first bore, pressure indicating means connected to the first bore, valve means in said second bore controlling the flow of pressurized fluid therethrough, a third bore in said casing communicating with said first bore and having an outlet, an orifice in said third bore between the junction of said first and third bores and said outlet and having a valve seat facing into said third bore, a valve element slidable on said third bore and having valve disc for engagement with said valve seat to close said orifice, means carried by said valve element dividing said third bore into first and second chambers, said first bore communicating with said first chamber, resilient means in said second chamber engaged with said valve element and imposing a force thereon tending to move said valve element to closed position, said valve element having effective surface areas disposed in said first and second chambers the effective area of said valve element in said first chamber being relatively less than the effective area thereof in said second chamber when said valve element is in closed position, control means effective in one position to intercommunicate said first and second chambers whereby the pressures therein are balanced and the net force produced thereby on the effective areas of said valve element when it is in its closed position augments the force of said resilient means to maintain said valve element in closed position, and in a second position to vent said second chamber whereby the pressures in said first and second chambers are unbalanced and the net force produced thereby on the effective areas of said valve element moves said valve element to open position against the biasing force of said resilient means to thereby open said orifice and permit flow from the tank through said valve, and a conical end carried by said valve element and operatively positioned in said orifice to regulate the rate of opening and closing of said valve element.

3. In a valve of the character described the combination comprising a casing, a bore in said casing having a valve seat including a central orifice adjacent one end and a wall closing the other end thereof, a valve element slidably mounted in said bore between said valve seat and wall, means carried by one end of said valve element for engagement with said valve seat to close said orifice, a tapered solid member carried by said one end of said valve element and extending into and through said orifice when said valve element is in closed position, means carried by said valve element and engaging said bore to divide said bore into first and second chambers, said valve element having effective areas disposed in said first and second chambers and exposed to the pressures therein, the effective area of said valve element disposed in said first chamber being relative by less than the effective area of said valve element disposed in said second chamber when said valve element is in closed position, means for balancing the pressures in said first and second chambers whereby a net force is produced by the balanced pressures acting on said relative effective areas that moves said valve element to the closed position, solenoid controlled means for unbalancing the pressures in said first and second chambers to produce a pressure differential therebetween whereby a net force is produced by said pressure differential acting on said relative effective areas that moves said valve element to open position, and said tapered member effective during the opening movement of said valve element to progressively increase the effective area thereof disposed in said first chamber to thereby increase the net force produced by said pressure differential and progressively increase the rate of said opening movement.

4. In combination with a tank for supplying pressurized air to the air-combustion starter of an aircraft engine, a compact fluid flow control unit comprising a casing having a first bore formed therein, said casing being attached by mounting extension to the bottom side wall of said tank with said first bore in communication with the interior of the tank, a pressure-operated and manually-operable valve connected by a passage in said mounting extension and said casing to the interior of said tank for pressure relief and when desired for cleaning the bottom of the tank, a second bore in said casing having one end adapted for connection to a source of pressurized gas and communicating with said first bore, a check valve in said second bore permitting flow only into said first bore and said tank, a third bore in said casing perpendicular to said first bore and having a closed end and an outlet at the other end, said first bore communicating with said third bore, control valve means including a spring-biased piston member in said third bore constructed and arranged for operation in response to the pressure of the fluid in the tank for controlling flow from said first bore through said outlet, a standpipe in the interior of the tank connected to the first bore for blocking undesirable accumulations from passing from the tank into said first bore, pilot means including an electric solenoid controlled transfer valve mounted on said casing for actuating said control valve means, and said pilot means being operatively connected to said third bore in operable relation to said piston member by passages in said casing.

References Cited in the file of this patent

UNITED STATES PATENTS

| | | |
|---|---|---|
| 1,533,082 | Alig | Apr. 14, 1925 |
| 1,910,283 | Fernholz | May 23, 1933 |
| 2,295,154 | Brower | Sept. 8, 1942 |
| 2,370,309 | Thomas | Jan. 5, 1943 |
| 2,383,961 | Freygang | Sept. 4, 1945 |
| 2,399,553 | Lindsay | Apr. 30, 1946 |
| 2,548,352 | Courtot | Apr. 10, 1951 |
| 2,555,483 | Grant | Jan. 5, 1951 |
| 2,617,444 | Gardner | Nov. 11, 1952 |